United States Patent [19]
Tanaka

[11] 3,933,076
[45] Jan. 20, 1976

[54] SCREW GROMMET
[75] Inventor: Toshie Tanaka, Tokyo, Japan
[73] Assignee: Nifco Inc., Tokyo, Japan
[22] Filed: Dec. 9, 1974
[21] Appl. No.: 530,633

[30] Foreign Application Priority Data
Dec. 20, 1973 Japan.................... 48-145182[U]

[52] U.S. Cl. .................. 85/80; 85/83; 151/41.75; 24/73 PF
[51] Int. Cl.² ....................................... F16B 13/06
[58] Field of Search .................... 85/80, 81, 82, 83; 151/41.75; 24/73 PF, 73 HS, 73 P, 208 A, 24/213 R

[56] References Cited
UNITED STATES PATENTS

| | | | |
|---|---|---|---|
| 1,755,590 | 4/1930 | Carr | 85/80 |
| 2,571,394 | 10/1951 | Trafton | 85/80 |
| 3,130,822 | 4/1964 | Meyer | 24/73 HS |
| 3,532,024 | 10/1970 | Gutshall | 85/80 |
| 3,830,134 | 8/1974 | Erickson | 85/80 |
| 3,836,704 | 9/1974 | Coules | 24/73 P |

Primary Examiner—Marion Parsons, Jr.
Attorney, Agent, or Firm—J. R. Halvorsen; R. W. Beart

[57] ABSTRACT

Disclosed is a screw grommet which is used to bolt an object to a plate or the like. The unique structure of a screw grommet according to this invention permits frictionless insertion of the leg of the grommet in an aperture of the plate and at the same time, positive engagement with the circumferential edge of the aperture of the plate.

5 Claims, 5 Drawing Figures

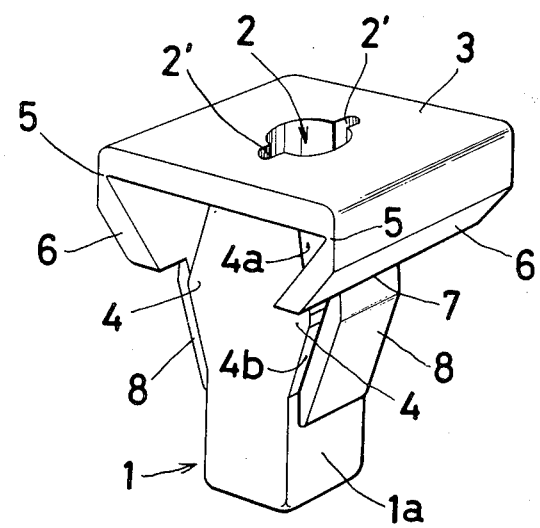
Fig. 1
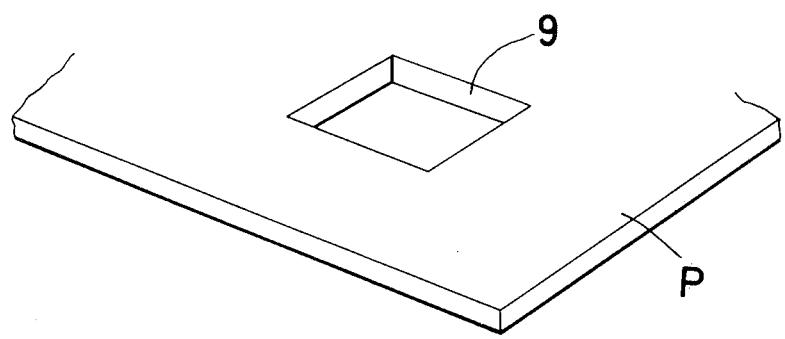

U.S. Patent Jan. 20, 1976 Sheet 3 of 3 3,933,076
Fig_4
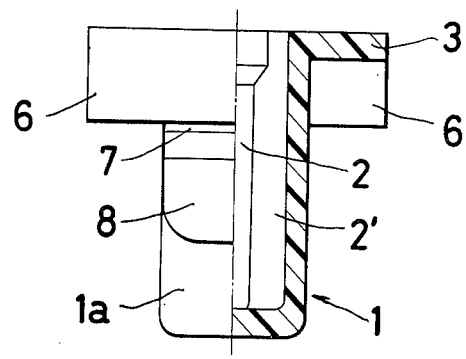
Fig_5
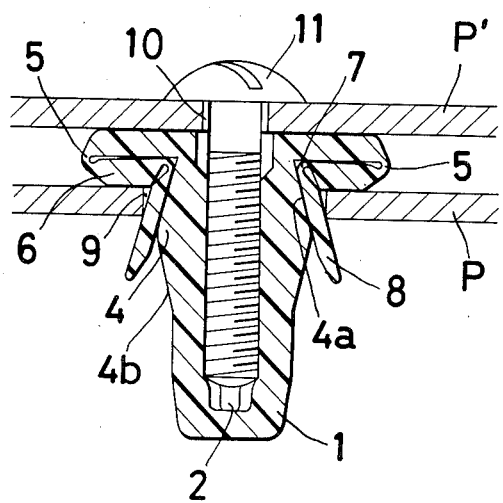

SCREW GROMMET

BACKGROUND OF THE INVENTION

This invention relates to a screw grommet made of a plastic material which is used to bolt printed circuit boards and various other parts to an electric machine or apparatus, an automobile chassis or other bodies.

A variety of plastic screw grommets have been hitherto proposed. One screw grommet which is widely used is a headed article having an inserting leg and a collar-shaped head integrally connected to the inserting leg. The leg has a tapped longitudinal hole and raised portions on the outer surface thereof. In use the grommet is pushed into an aperture of a plate which constitutes a part of an electric machine or apparatus or an automobile chassis. The leg of the grommet is pushed in the aperture, yieldingly reducing the diameter of the raised portion of the leg in passing through the aperture and allowing the raised portion of the leg to return to its original shape and size at the under surface of the plate. The grommet is positively fixed to the plate by sandwiching the thickness of the plate in between the head of the grommet and the raised portion of the leg of the grommet. An object to be fixed is laid on the head of the grommet, and a bolt is inserted and screwed in an aperture of the object, the aperture of the head and the tapped hole of the leg of the grommet. The bolt when driven into the tapped hole of the leg of the grommet, will cause the leg of the grommet to enlarge in diameter, thus positively preventing the grommet from slipping out from the aperture of the plate.

As mentioned above, the grommet is fixed in an aperture of a plate by yieldingly reducing the diameter of the bulge portion of the leg as it passes through the aperture of the plate. The plate, however, is usually made of a metal, and therefore it is likely that the bulge portion of the leg will be cut off and removed by the circumferential edge of the aperture of the plate. Consequently, the bulge portion of the leg cannot be raised as much as required for positive anchoring with the undersurface of the plate. In some instances it is very difficult to insert the bulge portion of the leg into an aperture of a plate against the resistive friction between the leg and the edge of the aperture.

The object of this invention, therefore, is to provide a screw grommet which can be easily fitted in an aperture of a plate and can still assure positive engagement with the plate.

SUMMARY OF THE INVENTION

To attain this object a screw grommet according to this invention comprises: an inserting leg having a tapped hole made along the axial direction from the upper center portion of said leg, said leg having projections symmetrically provided on two opposite sides of said leg with the axis of said leg therebetween; a flange head overhanging the upper periphery of said leg, said flange head having arm plates extending from two opposite edges of the flange head via a first hinge portion and resting on the point of its corresponding projection; and a pop-up piece extendedly provided on the free end of each of said arm plates through a second hinge portion.

BRIEF DESCRIPTION OF DRAWINGS

This invention will be better understood from the following description which is made with reference to the accompanying drawings:

FIG. 1 shows a perspective view of a screw grommet according to this invention;

FIG. 4 shows a side view of the screw grommet, partly in section; and

FIG. 5 shows, in section, the manner in which the screw grommet is used to fix an object to a plate.

DESCRIPTION OF THE PREFERRED EMBODIMENT

Figure 2:
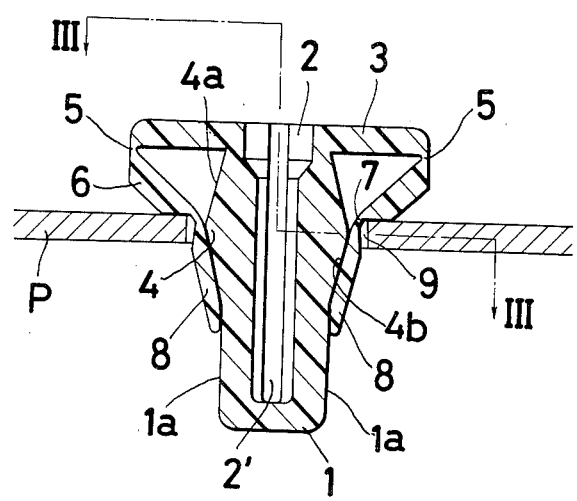
FIG. 2 shows a longitudinal section of the screw grommet which is inserted midway in the aperture of the plate.
Figure 3:
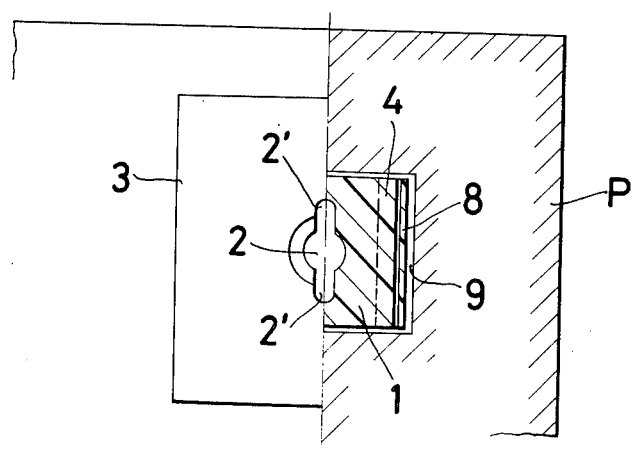
FIG. 3 shows a plane section of the screw grommet taken along the line III—III in FIG. 2.

Referring to the drawings, 1 is an inserting leg having a tapped longitudinal hole 2. The leg is square in section and a head 3 is integrally connected to the top of the leg 1 and extends from the top periphery of the leg 1. The leg 1 has two mountain-shaped projections 4 symmetrically provided on two opposite sides of the leg.

The flange head 3 is square-shaped. The head has arm plates 6 extending from two opposite edges of the square head via first hinge portions 5. The arm plate 6 is long enough for the free end thereof to reach and rest on the point of the mountain-shaped projection. A pop-up piece 8 is extendedly provided on the free end of each arm plate 6 through a second hinge portion 7.

The arm plate 6 is long enough to reach the point of the mountain-shaped projection and at the same time it is as long as the flange extension of the head. Therefore, the arm, if folded at the first hinge portions 5, will be laid on the underside of the flange extension of the head 3.

In the normal position the two arm plates converge so that their free ends rest on the points of the mountain-shaped projections, whereas the pop-up pieces lie on the lower slopes of the projections. (See FIG. 1.) Thus, in the normal position the flange extension of the head, the arm plate 6 and the upper slope 4a of the mountain-shaped projection 4 together constitute an isosceles triangle space, and the pop-up piece lies on the lower slope 4b of the mountain-shaped projection 4. When the arm plate is folded at the first hinge portion and when the arm plate 6 is laid on the undersurface of the flange extension of the head 3, the second hinge portion 7 is moved from the point of the mountain-shaped projection 4 to the upper slope 4a thereof and at the same time the pop-up piece is pulled up along the upper slope of the mountain-shaped projection, thus causing the free ends of the pop-up pieces to diverge. This movement of the arm plate and the pop-up piece is performed when the grommet is fitted in an aperture 9 of a panel, as described hereinafter in more detail.

A panel P is, for instance, a part of an automobile chassis, and an aperture 9 of the plate is of such a size and shape that the leg of the grommet can be tightly fitted in the aperture 9. The grommet is inserted in the aperture 9 with the pop-up pieces laid on the lower slopes 4b of the mountain-shaped projections 4 of the leg 1. The leg 1 of the grommet is smoothly inserted in the aperture 9 by allowing the circumferential edge of the aperture 9 to slide on the slope surfaces of the pop-up pieces 8 up to the second hinge portions 7. Then, the arm plates 6 extending from the flange head 3 prevent further insertion of the leg of the grommet in the aperture. When a strong downward force is applied to the head of the grommet, the second hinge portion 7 is shifted from the top of the mountain-shaped projection 4 to the upper slope 4a thereof, thus causing the arm plates 6 to bend at the first hinge portions 5 until the arm plates are laid on the undersurfaces of the flange extensions of the head 3. At the same time, the pop-up pieces 8 are shifted to the upper slopes of the mountain-shaped projections 4 and are bent at the second hinge portions 7 to diverge toward their free ends. Thus, the circumferential edge of the aperture is tightly clamped between the arms and the diverging pop-up pieces, and in this position the grommet is preliminarily fixed to the plate prior to the bolting operation.

An object P' to be fixed is laid on the upper surface of the flange head, and a bolt 11 is inserted in an aperture 10 of the object and the aperture of the head 3 of the grommet, and then the bolt 10 is driven in the tapped hole 2 of the leg 1 of the grommet. The invasion by the bolt into the longitudinal hole of the leg of the grommet causes outward expansion of the leg, thus completely preventing the descent of the second hinge portions 7 and at the same time, further diverging the pop-up pieces 8. Thus, the grommet is completely prevented from slipping out of the aperture 9 of the plate.

In this particular embodiment, the leg of the grommet has two longitudinal slots 2' with a view to making it easy for the leg to enlarge as the bolt further invades the longitudinal hole of the leg.

As mentioned above in detail, when a screw grommet according to this invention, is inserted in an aperture of a panel, the arm plates extending from two opposite edges of the head are bent at the first hinge portions, and are laid on the under surfaces of the flange extensions of the head, whereas the pop-up pieces which are integrally connected to the free ends of the arm plates via the second hinge portions, are pulled up and diverged in such a way that the pop-up pieces cooperate with the folded arm plates to grip the circumferential edge of the aperture, and when a bolt is driven in the tapped hole of the leg, the leg is accordingly enlarged, thus causing its bulge portions to further enlarge so as to diverge and push the pop-up pieces against the circumferential edge of the aperture thus providing a positive gripping of the panel. When the leg of the grommet is inserted in an aperture of a panel, the leg is smoothly inserted until the opening edge reaches the second hinge portion, and when the leg is pushed and further inserted in the aperture, the opening edge while continuously staying on the second hinge portion, climbs and passes over the point of the mountain-shaped projection, and hence there is no substantial friction between the leg and the opening edge. This friction-less insertion results from the sliding of the second hinge portion over the projection of the leg. (The plastic-to-plastic contact reduces friction to a minimum.) Also, the unique structure of this invention permits, in designing, the enlargement of the bulge portion of the leg of the grommet, so as to assure positive catching of the opening edge of the plate. This friction-less insertion is very advantageous in grommet-fixing work.

The grommet according to this invention can be integrally molded from a plastic material, and hence it can be produced with ease and at a reduced cost.

In the embodiment as shown in the drawings the projections of the leg of the grommet are formed in the shape of mountains. This shape is advantageous because it facilitates the change in the incline direction of the pop-up piece from converging to diverging when the arm plates are folded at the first hinge portion and are laid on the flange extensions of the head. The lower and upper slopes of the mountain-shaped projections only assure the smooth progress of the pop-up pieces along the contour of the projections. Therefore, this sloping is preferable but not necessary, and what is important is that the projections are as high as required for the purpose.

What is claimed is:

1. A one-piece plastic screw grommet for use in a complimentary polygonal-shaped panel aperture, said grommet including a leg having a polygonal cross section and a head at one end which extends laterally in at least two opposite directions from said leg a predetermined distance terminating in a pair of opposite edges, a bore traversing said head and extending axially into said leg, said leg having a first pair of slopes diverging outwardly in the same two opposite directions from its juncture with said head to a point intermediate its length and then converging inwardly along a second pair of slopes toward its opposite end to provide a pair of shoulders at the juncture of said slopes which project outwardly from said leg in the same directions as the edges of the head, the distance from each of said edges to the adjacent shoulder on the leg being substantially equal to said predetermined distance from said edge to the juncture of said head and leg, a pair of first planar means each hingedly connected to one of said edges and each initially extending angularly from one of said edges to its adjacent shoulder, second planar means hingedly connected to each of said first planar means and initially lying generally in the direction of and along said second pair of slopes, whereby when said grommet leg and said second planar means are inserted into said panel aperture and axial pressure applied to move said first planar means from its initial angular position to a position juxtaposed to said head, said hingedly connected second planar means are angularly moved into engagement with said first pair of diverging slopes and caused to underlie said panel aperture edges in opposition to said head.

2. A screw grommet of the type claimed in claim 1 wherein said first pair of planar means are provided with a beveled free end opposite its hinged connection to the head, said beveled edge being adapted to fit upon said panel during insertion of the grommet.

3. A screw grommet of the type claimed in claim 2 wherein the second planar means at the point of its hinged connection to said first planar means is relieved to accommodate its movement from a converging initial position to a diverging final mounted position.

4. A screw grommet of the type claimed in claim 1 wherein said bore terminates short of the end of said leg and said bore further being relieved to assist in expansion of said grommet upon insertion of a screw therein whereby said leg expands against said second planar means to insure its engagement with the apertured edge.

5. A screw grommet of the type claimed in claim 1 wherein said head extends laterally from said leg in all directions, said first planar means being generally coextensive with the edges of said head and being greater than the dimension of said aperture, said second planar means being less in width than said first planar means and being not greater than the width of said leg and thereby being readily acceptable within said panel aperture.

* * * * *